United States Patent
Fellows (10) Patent No.: US 11,411,235 B2
(45) Date of Patent: Aug. 9, 2022

(54) METHOD FOR DETECTING AND LESSENING FUEL STARVATION IN FUEL CELL SYSTEMS

(71) Applicants: Daimler AG, Stuttgart (DE); Ford Motor Company, Dearborn, MI (US)

(72) Inventor: Richard Fellows, Vancouver (CA)

(73) Assignees: Daimler AG, Stuttgart (DE); Ford Motor Company, Dearborn, MI (US)

( * ) Notice: Subject to any disclaimer, the term of this patent is extended or adjusted under 35 U.S.C. 154(b) by 210 days.

(21) Appl. No.: 16/480,630

(22) PCT Filed: Feb. 2, 2018

(86) PCT No.: PCT/IB2018/000077
§ 371 (c)(1),
(2) Date: Jul. 24, 2019

(87) PCT Pub. No.: WO2018/150251
PCT Pub. Date: Aug. 23, 2018

(65) Prior Publication Data
US 2019/0386323 A1 Dec. 19, 2019

Related U.S. Application Data

(60) Provisional application No. 62/450,764, filed on Feb. 18, 2017.

(51) Int. Cl.
*H01M 8/04* (2016.01)
*H01M 8/04746* (2016.01)
(Continued)

(52) U.S. Cl.
CPC ... *H01M 8/04753* (2013.01); *H01M 8/04097* (2013.01); *H01M 8/04201* (2013.01);
(Continued)

(58) Field of Classification Search
CPC ......... H01M 8/04753; H01M 8/04097; H01M 8/04201; H01M 8/04231; H01M 8/04559;
(Continued)

(56) References Cited

U.S. PATENT DOCUMENTS

2013/0344406 A1* 12/2013 Paganelli .......... H01M 8/04231
429/414
2014/0162160 A1 6/2014 Chen

FOREIGN PATENT DOCUMENTS

DE 10 2009 036197 2/2011
EP 2 544 287 1/2013

OTHER PUBLICATIONS

PCT International Search Report and Written Opinion dated May 7, 2018 for PCT/IB2018/000077 filed Feb. 2, 2018.

* cited by examiner

*Primary Examiner* — Raymond Alejandro
(74) *Attorney, Agent, or Firm* — Farjami & Farjami LLP (57) ABSTRACT

Methods are disclosed for detecting and lessening fuel starvation conditions in an operating fuel cell system. The fuel cell systems comprise a solid polymer electrolyte fuel cell with a regulating apparatus for regulating the pressure of fuel supplied to the anode inlet of the fuel cell, in which the outlet pressure from the regulating apparatus oscillates during operation. The methods involve monitoring an electrical output of the fuel cell during operation, determining the amplitude of oscillation in the electrical output, and then, if the determined amplitude of oscillation in the electrical output exceeds a predetermined amount thereby indicating a fuel starvation condition, taking a remedial action to lessen the fuel starvation condition.

11 Claims, 4 Drawing Sheets

(51) Int. Cl.
*H01M 8/04089* (2016.01)
*H01M 8/04082* (2016.01)
*H01M 8/04223* (2016.01)
*H01M 8/04537* (2016.01)
*H01M 8/04701* (2016.01)
*H01M 8/04828* (2016.01)
*H01M 8/10* (2016.01)

(52) U.S. Cl.
CPC ... *H01M 8/04231* (2013.01); *H01M 8/04559* (2013.01); *H01M 8/04589* (2013.01); *H01M 8/04723* (2013.01); *H01M 8/04835* (2013.01); *H01M 8/10* (2013.01); *H01M 2008/1095* (2013.01); *H01M 2250/20* (2013.01)

(58) Field of Classification Search
CPC ......... H01M 8/04589; H01M 8/04723; H01M 8/04835; H01M 8/10; H01M 2008/1095; H01M 2250/20
See application file for complete search history.

METHOD FOR DETECTING AND LESSENING FUEL STARVATION IN FUEL CELL SYSTEMS

BACKGROUND

Field of the Invention

This invention relates to methods for detecting and lessening fuel starvation conditions in an operating fuel cell system. In particular, it relates to fuel cell systems comprising a solid polymer electrolyte fuel cell with regulating apparatus for regulating the pressure of fuel supplied to the anode inlet, in which the outlet pressure from the regulating apparatus oscillates when the fuel cell system is operating.

Description of the Related Art

Fuel cells such as solid polymer electrolyte (or proton exchange membrane) fuel cells electrochemically convert fuel and oxidant reactants (such as hydrogen and oxygen or air respectively) to generate electric power. Solid polymer electrolyte fuel cells employ a proton conducting, solid polymer membrane electrolyte between cathode and anode electrodes. A structure comprising a solid polymer membrane electrolyte sandwiched between these two electrodes is known as a membrane electrode assembly (MEA). In a typical fuel cell, flow field plates comprising numerous fluid distribution channels for the reactants are provided on either side of a MEA to distribute fuel and oxidant to the respective electrodes and to remove by-products of the electrochemical reactions taking place within the fuel cell. Water is the primary by-product in a cell operating on hydrogen and air reactants. Because the output voltage of a single cell is of order of 1V, a plurality of cells is usually stacked together in series for commercial applications in order to provide a higher output voltage. Fuel cell stacks can be further connected in arrays of interconnected stacks in series and/or parallel for use in automotive applications and the like.

Along with water, heat is a significant by-product from the electrochemical reactions taking place within the fuel cell. Means for cooling a fuel cell stack is thus generally required. Stacks designed to achieve high power density (e.g. automotive stacks) typically circulate liquid coolant throughout the stack in order to remove heat quickly and efficiently. To accomplish this, coolant flow fields comprising numerous coolant channels are also typically incorporated in the flow field plates of the cells in the stacks. The coolant flow fields may be formed on the electrochemically inactive surfaces of the flow field plates and thus can distribute coolant evenly throughout the cells while keeping the coolant reliably separated from the reactants.

A fuel cell system based on a solid polymer electrolyte fuel cell stack or stacks therefore typically contains several subsystems for delivering the reactant and coolant fluids to the fuel cell stack and for exhausting the exhaust fluids from the fuel cell stack. These subsystems can employ apparatus for purposes of controlling the pressure and flow rates of the supplied fluids, for adjusting the humidity and/or temperature of the fluids, and/or for removing water from the exhaust fluids. A fuel supply subsystem usually at least comprises a fuel supply (e.g. hydrogen) and a regulating apparatus for regulating the pressure of fuel supplied to the anode inlet of the fuel cell stack. In addition though, many fuel supply subsystems include a fuel recirculation line for recirculating exhaust from the anode outlet back to the anode inlet. This recirculation prevents stagnation in the stack anodes and allows for water to be removed while minimizing wastage of supplied fuel. To drive the recirculation of the exhaust fluid, the subsystem typically incorporates apparatus such as a jet pump or hydrogen recycle blower. In common embodiments of fuel supply subsystems, the functioning is such that the outlet pressure from the regulating apparatus oscillates during operation of the fuel cell system.

A potential issue with a series stack of electrochemical cells of any kind is the possibility for having voltage reversals occur in one or more cells in the stack. This can happen when, for some reason, an affected cell becomes incapable of delivering the same amount of current as its peers in the stack. If the cell is weak enough and the current drawn from the stack is high enough, the other cells in the stack can drive the weak cell into a voltage reversal condition. This can cause damage to the weak cell, thereby weakening it even further. The performance capability of the stack is degraded accordingly.

In fuel cells, fuel starvation is a well known condition that can weaken a cell and lead to voltage reversal situations. Fuel starvation can arise for various reasons. For instance, after storage in below freezing conditions, ice may form in the flow fields of the fuel cells and block the flow of fuel in or to the anode in a cell in the stack. The now inadequate supply of fuel in that cell results in a fuel starvation condition. The affected cell can then be driven into voltage reversal by the current from other cells in the series stack, and can suffer rapid and severe damage depending on the extent and duration of the voltage reversal. Stack failure may occur through internal shorting. Reversals, if undetected and unmitigated, can cause catastrophic stack failure.

Numerous approaches have been proposed in the art for dealing with the problems associated with voltage reversal, and particularly for preventing or dealing with fuel starvation conditions that can lead to voltage reversal. U.S. Pat. No. 6,936,370 discusses various circumstances which can result in a solid polymer electrolyte fuel cell being driven into voltage reversal as well as the reactions taking place within. And further, U.S. Pat. No. 6,936,370 discloses means for improving the tolerance of cells against the adverse effects of voltage reversal. For instance, in order to pass current during fuel starvation, reactions such as water electrolysis and oxidation of anode components may take place at the fuel cell anode. The latter reactions can result in irreversible damage. However, promoting the former electrolysis reaction over anode component oxidation can make fuel cells much more tolerant to cell reversal. This can be accomplished by incorporating a catalyst composition at the anode to promote the water electrolysis reaction, in addition to the typical anode catalyst used to promote fuel oxidation. The incorporated catalyst composition is thus selected specifically to electrolyze water and is commonly known as an oxidation evolution reaction catalyst. A typical catalyst composition for this purpose comprises iridium oxide.

Another approach is to detect and then take appropriate action to mitigate against voltage reversals. A common approach in the art has been to implement cell voltage monitoring in the system, which involves monitoring the voltage of each individual cell in the stack. While voltage reversal can reliably be detected in this manner, the cell voltage monitor (CVM) apparatus required can be prohibitively complex and expensive.

Other techniques developed in the field to detect voltage reversal conditions and to prevent any resulting damage include for instance, granted Japanese patents JP5200414 and JP5287815, which disclose methods for detecting voltage reversal at either electrode. Granted Japanese patent JP4998609 on the other hand discloses a method for avoiding degradation during voltage reversal. In another example, US20130095405 discloses a fuel cell system and method based on use of an accumulated current value measuring unit.

In another approach, high anode fuel partial pressures may be employed to reduce the likelihood of fuel starvation. However, using high fuel partial pressures generally cause large losses of fuel from permeation. In yet another approach, frequent and thorough purging of the anodes which has been triggered by the measured fuel and nitrogen concentrations has been considered. However, such an approach requires the use of costly fuel and nitrogen sensors.

Despite the advances made to date, there remains a need for better protection of fuel cell systems from harm arising from potential fuel starvation events during operation. This invention represents an option for fulfilling these needs and provides further related advantages.

SUMMARY

Fuel cell systems typically have a regulating apparatus for regulating the pressure of the fuel supplied to the fuel cell stack in the system. In systems where the outlet pressure from the regulating apparatus oscillates during operation (e.g. systems equipped with a fuel recirculation loop and a regulating apparatus comprising a jet pump in the loop), the performance of the fuel cell stack will also oscillate to a certain extent as a result of the periodic increase in fuel pressure provided to the anodes in the fuel cell stack. It was noticed however that the amplitude of these oscillations in stack performance could at times become more significant. It was determined that this can result when the stack is undergoing a fuel starvation event in one or more cells, and the increase in fuel pressure and hydrogen flow through the stack can cause these regions of partial fuel starvation to recover, thereby resulting in a more noticeable increase in fuel cell stack performance. It was realized that partial fuel starvation conditions could thus be detected and lessened by monitoring the electrical output of the fuel cell stack and by taking appropriate remedial action based on the amplitude of the oscillations in this electrical output.

Specifically, the method of the invention relates to fuel cell systems comprising a solid polymer electrolyte fuel cell, an oxidant supply subsystem, a fuel supply subsystem which at least comprises a fuel supply and a regulating apparatus for regulating the pressure of fuel supplied to an anode inlet of the fuel cell, and an electrical output monitor for monitoring an electrical output of the fuel cell. In the fuel supply subsystem, the fuel supply is connected to an inlet of the regulating apparatus and the anode inlet of the fuel cell is connected to an outlet of the regulating apparatus. Further, the outlet pressure from the regulating apparatus outlet oscillates when the fuel cell system is operating. The inventive method comprises monitoring the electrical output of the fuel cell while the fuel cell system is operating, determining the amplitude of oscillation in the electrical output of the fuel cell resulting from the oscillation in the regulating apparatus outlet pressure, and if the determined amplitude of oscillation in the electrical output exceeds a predetermined amount (thereby indicating a fuel starvation condition), taking a remedial action to lessen the fuel starvation condition.

In an exemplary embodiment of the invention, the fuel supply subsystem can comprise a fuel recirculation line connecting an anode outlet of the fuel cell to the anode inlet of the fuel cell, and the regulating apparatus comprises a jet pump. The jet pump can comprise a high pressure nozzle inlet, a low pressure inlet, and an outlet. And in the subsystem, the fuel supply is connected to the high pressure nozzle inlet and the fuel recirculation line is connected in series to the low pressure inlet and the outlet of the jet pump.

In an alternative embodiment, the fuel supply subsystem may also comprise a fuel recirculation line connecting an anode outlet of the fuel cell to the anode inlet of the fuel cell, while the regulating apparatus may comprise a hydrogen recycle blower.

In a yet further alternative embodiment, the fuel supply subsystem may not employ a fuel recirculation line or loop. Here, the regulating apparatus may instead simply comprise an on-off valve.

The method is appropriate for use in fuel cell systems in which the outlet pressure from the regulating apparatus outlet oscillates relatively quickly, e.g. with a period of less than 5 seconds. Suitable electrical output monitors for use in the fuel cell system include a voltage output monitor or a current output monitor when the electrical output is voltage or current respectively.

In embodiments in which operation of the fuel cell system comprises a normal periodic purging step comprising purging a normal amount of purge gas from the fuel cell anode, a suitable remedial action can comprise purging a greater than normal amount of purge gas from the fuel cell anode if the determined amplitude of oscillation in the electrical output exceeds the predetermined amount. In other embodiments, suitable remedial actions include operating the regulating apparatus such that the outlet pressure from the regulating apparatus outlet is at greater pressure, reducing the current drawn from the fuel cell, delaying an increase in the current drawn from the fuel cell, reducing the coolant inlet temperature, and/or increasing the relative humidity of the oxidant supplied to the fuel cell cathode.

If desired, the sensitivity of the method can be increased by periodically reducing the fuel pressure at the anode inlet of the fuel cell. Such action can increase the amplitude of oscillation in the electrical output of the fuel cell.

The method of the invention is for use in systems comprising solid polymer electrolyte fuel cell stacks, and is particularly suitable for use in automotive fuel cell systems. For instance, by detecting and addressing fuel starvation situations in this way, there is no need for a complex and expensive CVM apparatus in the system.

Systems of the invention comprise a solid polymer electrolyte fuel cell, an oxidant supply subsystem, a fuel supply subsystem, and an electrical output monitor for monitoring an electrical output of the fuel cell. The fuel supply subsystem therein comprises a fuel supply, and a regulating apparatus for regulating the pressure of fuel supplied to an anode inlet of the fuel cell in which the fuel supply is connected to an inlet of the regulating apparatus and the anode inlet of the fuel cell is connected to an outlet of the regulating apparatus, and in which the outlet pressure from the regulating apparatus outlet oscillates when the fuel cell system is operating. In addition, the system is configured to operate according to the aforementioned methods.

These and other aspects of the invention are evident upon reference to the attached Figure and following detailed description.

BRIEF DESCRIPTION OF THE DRAWINGS

FIG. 4 illustrates an option for increasing the sensitivity of the inventive method by periodically reducing the fuel pressure at the anode inlet. In FIG. 4, the anode inlet pressure and stack voltage versus time are illustrated.

DETAILED DESCRIPTION

In this specification, words such as "a" and "comprises" are to be construed in an open-ended sense and are to be considered as meaning at least one but not limited to just one.

Herein, in a quantitative context, the term "about" should be construed as being in the range up to plus 10% and down to minus 10%.

The present methods of the invention are useful for detecting and lessening fuel starvation conditions in certain operating fuel cell systems. Applicable fuel cell systems comprise a solid polymer electrolyte fuel cell with a regulating apparatus for regulating the pressure of fuel supplied to the anode inlet of the fuel cell, and in which the outlet pressure from the regulating apparatus oscillates during operation. The methods involve monitoring an electrical output of the fuel cell during operation, determining the amplitude of oscillation in the electrical output, and then, if the determined amplitude of oscillation in the electrical output exceeds a predetermined amount thereby indicating a fuel starvation condition, taking a remedial action to lessen the fuel starvation condition.

Figure 1:
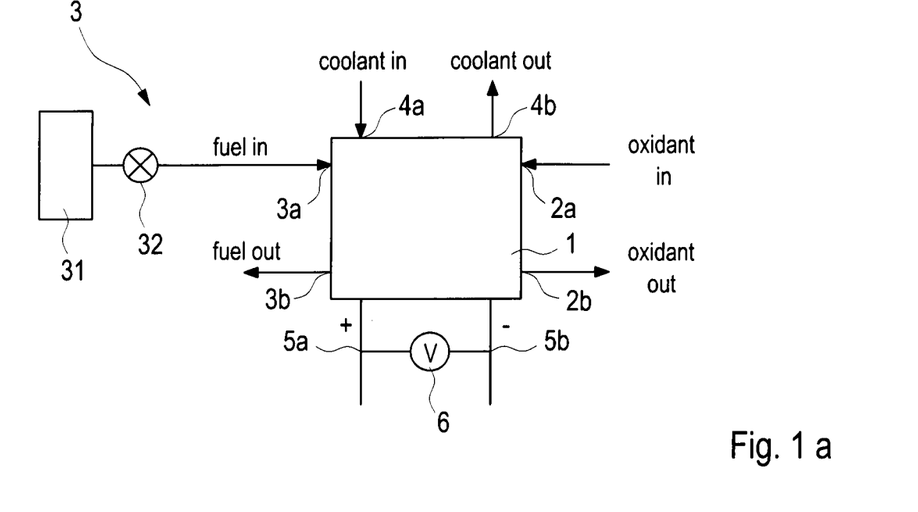
FIGS. 1a, 1b and 1c show simplified schematics of exemplary automotive fuel cell systems in which different options are employed for the regulating apparatus of the fuel supply subsystem. The system in FIG. 1a employs a simple on-off valve but no recirculation. The systems in FIGS. 1b and 1c employ a jet pump and a hydrogen recycle blower respectively, and both recirculate the fuel.

FIGS. 1a, 1b and 1c show simplified schematics of exemplary applicable fuel cell systems which may be used in automotive applications. In each figure, a different applicable option is employed for the regulating apparatus of the fuel supply subsystem. The fuel supply subsystem in FIG. 1a employs a simple on-off valve but does no recirculation of fuel from the anode outlet back to the anode inlet. The subsystems in FIGS. 1b and 1c employ a jet pump and a hydrogen recycle blower respectively, and both include a recirculation loop to recirculate the fuel.

In FIG. 1a, the fuel cell system includes fuel cell stack 1 which comprises a series stack of solid polymer electrolyte fuel cells (not called out in FIG. 1a). An oxidant supply subsystem (not called out) is used to deliver compressed ambient air (which has been filtered, cooled and humidified as required) as the supply of oxidant to cathode inlet 2a of fuel cell stack 1. Oxygen-depleted air and by-product water vapour and liquid water is exhausted from fuel cell stack 1 at cathode outlet 2b. Fuel supply subsystem 3 comprises a compressed hydrogen fuel supply 31 and on-off valve 32 which serves as a regulating apparatus for regulating the pressure of the hydrogen supplied to anode inlet 3a. The outlet pressure from on-off valve 32 oscillates as it is opened and closed while the fuel cell system is operating. The hydrogen depleted exhaust stream from the anode of fuel cell stack 1 is exhausted at anode outlet 3b. To maintain an appropriate operating temperature for fuel cell stack 1, a coolant supply subsystem (not called out) is used to circulate coolant within the stack via coolant inlet 4a and coolant outlet 4b. Electrical power is output from fuel cell stack 1 at positive and negative terminals 5a and 5b respectively. For purposes of the inventive method, in the embodiment of FIG. 1a, the relevant electrical output being monitored is the stack voltage and voltmeter 6 serves as the electrical output monitor.

The fuel cell system of FIG. 1b is similar to that of FIG. 1a except that fuel cell subsystem additionally comprises recirculation loop 33 (which connects anode outlet 3b to anode inlet 3a) and jet pump 34. Here, on-off valve 32 again serves to provide regulation for the regulating apparatus. Via on-off valve 32, fuel supply 31 is connected to high pressure nozzle inlet 34a of jet pump 34. Exhaust from anode outlet 3b is delivered to low pressure inlet 34b of jet pump 34 via recirculating loop 33. And anode inlet 3a is connected to outlet 34c of jet pump 34. The outlet pressure from jet pump 34 oscillates as a result of cycling of on-off valve 32 while the fuel cell system is operating.

The fuel cell system of FIG. 1c is similar to that of FIG. 1b except that instead of jet pump 34, fuel cell subsystem employs hydrogen recycle blower 36 to power the recirculation of fuel in recirculation loop 33. The outlet pressure from hydrogen recycle blower 36 oscillates as a result of cycling of the hydrogen recycle blower while the fuel cell system is operating.

In general, the method of the invention involves identifying a fuel starvation condition based on the oscillations that arise in the electrical output of the fuel cell as a result of oscillations occurring in the outlet fuel pressure from the regulating apparatus. To do so, an appropriate electrical output of the fuel cell is monitored while the fuel cell system is operating. From that, the amplitude of oscillation in the electrical output of the fuel cell is determined, and a fuel starvation condition is indicated if the determined amplitude of oscillation in the electrical output exceeds a predetermined amount. An appropriate remedial action is then taken to lessen the fuel starvation condition.

The monitored electrical output of the fuel cell can be voltage or current. For instance, in an embodiment comprising a jet pump as a regulating apparatus (as shown in FIG. 1b), the fuel cell stack performance varies during the jet pump cycles. Typically, the outlet pressure of the fuel pump might oscillate with a relatively short period (e.g. <5 seconds). In an alternative embodiment, the stack voltage rise during initial pressurization of the anode loop may be monitored. Here, voltage oscillations with increasing anode pressure are indicative of possible fuel starvation events.

In setting an appropriate and satisfactory value for the predetermined amount which is used to identify when remedial action is to be taken, consideration is given to voltage changes associated with fuel starvation in individual cells and also the number of cells in the series stack. In individual cells, fuel starvation conditions, or the onset of them, may be associated with voltage changes of about 200 mV up to 1V. In a stack comprising several hundred cells, this amounts to only an average of several mV/cell.

Based on the preceding description and representative information appearing in the Examples to follow, those skilled in the art will be expected to be able to determine an appropriate voltage change (i.e. predetermined amount) for a given stack design and operating conditions to effectively detect the onset of potentially problematic fuel starvation conditions. And thereafter, appropriate remedial action can be taken.

Then, in case that a fuel starvation event is detected, the method comprises taking one or more remedial actions to lessen and preferably clear the fuel starvation condition. These methods include:

- in fuel cell stacks employing a normal periodic purging step during operation, purging more than the usual amount of purge gas from the fuel cell anode;
- avoiding low anode pressure, by operating the regulating apparatus such that the outlet pressure from the regulating apparatus outlet is at greater pressure. If necessary, the cathode pressure could also be increased to avoid exceeding a cross-pressure limit across the cathode and anode;
- reducing the current drawn from the fuel cell, even to zero, especially during start-up below freezing temperatures when the risk of voltage reversals is great;
- delaying an increase in the current drawn from the fuel cell, e.g. delaying driving away normally after starting a fuel cell vehicle;
- reducing the coolant inlet temperature in stacks with circulating liquid coolant; and
- increase the relative humidity of the oxidant supplied to the cathode inlet of the fuel cells to mitigate overdrying of the active area inlet which can occur at low fuel recirculation rates.

In order to make the inventive method more sensitive, certain additional techniques may optionally be employed. For instance, such techniques include periodically reducing the anode pressure (as demonstrated in the following Examples).

The following Examples have been provided to illustrate certain aspects of the invention, but they should not be construed as limiting in any way.

EXAMPLES

In the following tests, a fuel cell system comprising a solid polymer electrolyte fuel cell stack and suitable for use in automotive applications was employed. The system employed a recirculation line for recirculating anode exhaust back to the anode inlet. A jet pump was employed in the recirculation line as generally shown in the schematic of FIG. 1b.

The reactants supplied to the stack were hydrogen and air and the stack was operated under conditions typical of automotive applications. In particular, fresh fuel was supplied to the stack via an on-off type of regulating apparatus. This resulted in cycling of the jet pump output pressure and hence cycling of the anode inlet pressure.

Figure 2:
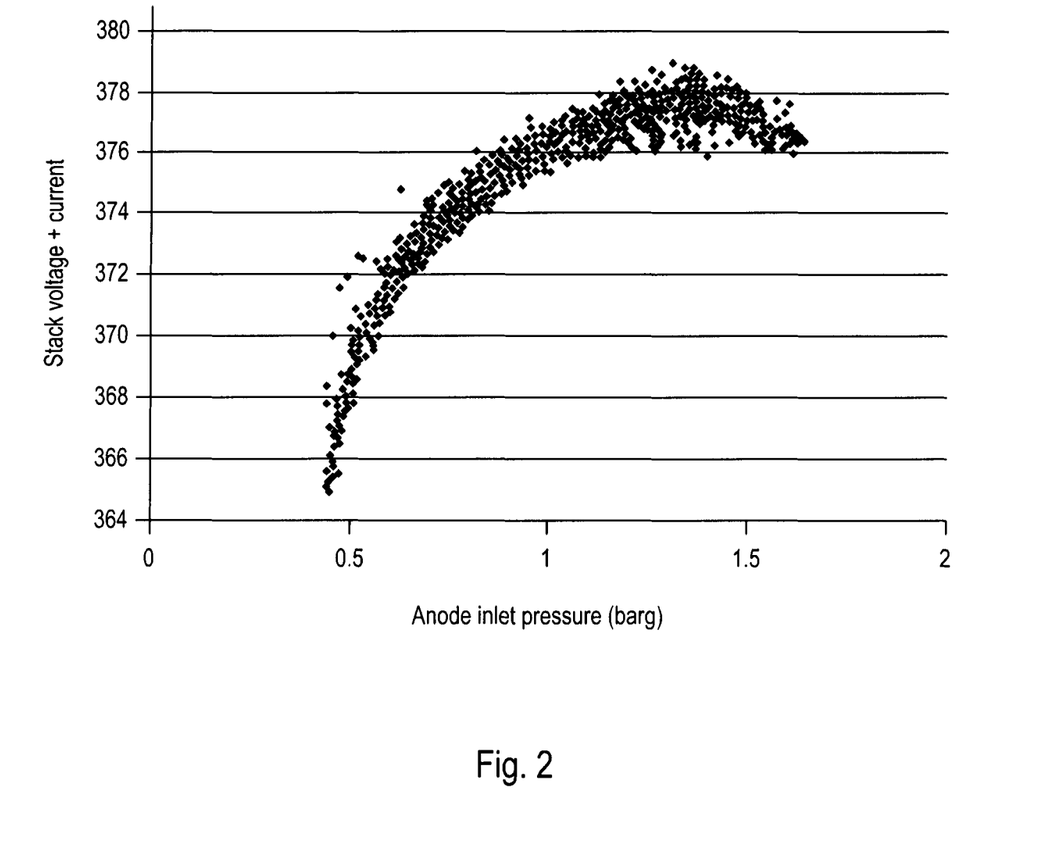
FIG. 2 shows plots of voltage versus anode inlet pressure for a fuel cell stack in the Examples.
Figure 3:
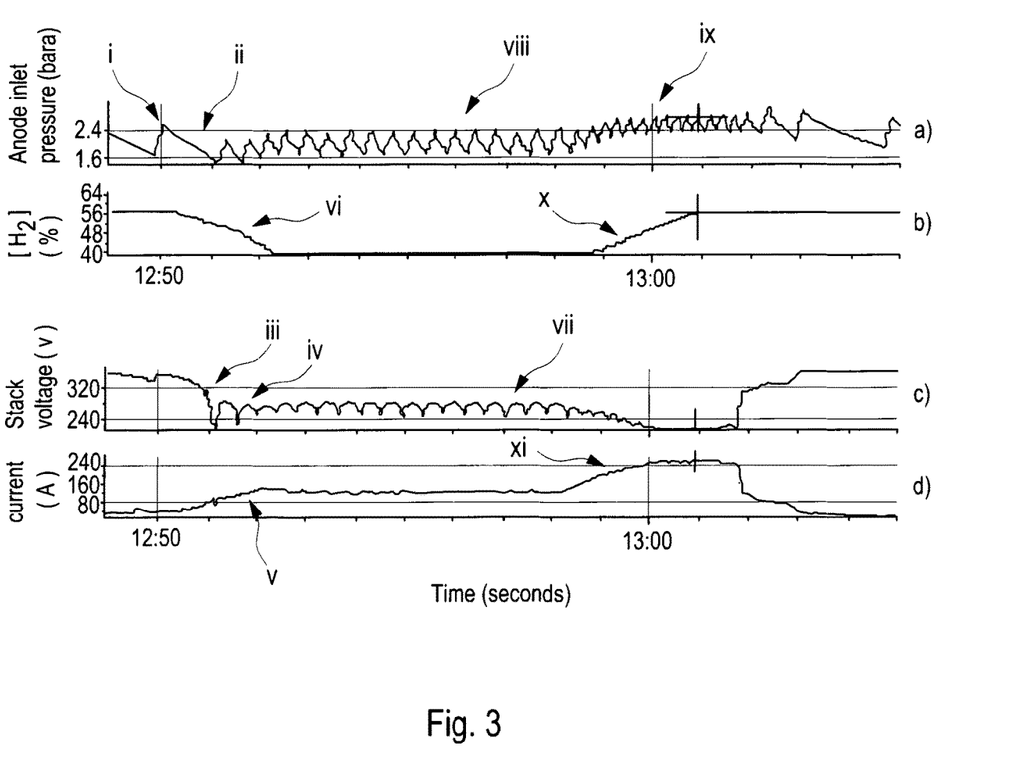
FIGS. 3a, 3b, 3c, and 3d show plots of anode inlet pressure, [$H_2$] at the anode outlet, stack voltage, and current versus time respectively for a fuel cell stack in the Examples, just before and just after a voltage reversal event.

FIG. 2 illustrates the sensitivity of stack voltage to the pressure of the fuel supplied to the anode inlet of the stack. In FIG. 2, the stack voltage and pressure at the anode inlet were logged at a 1 Hz frequency while the stack was operated with the jet pump cycling. The $[H_2]$ at the anode outlet was 25% in this example. The anode inlet pressure was seen to vary over a range from about 0.5 to 1.5 barg. A significant and measurable variation in stack voltage was also observed as a function of the anode inlet pressure. In this test, the stack voltage declined rapidly when the anode pressure inlet fell below 0.5 barg.

A similar fuel cell system to that of FIG. 2 was undergoing routine lifetime testing and was being monitored extensively and continuously while operating. (This included monitoring of both stack and individual fuel cell voltages, stack current, reactant pressures, along with other parameters.) An unexpected voltage reversal event occurred during this testing as a result of insufficient routine anode purging. FIGS. 3a, 3b, 3c, and 3d show plots of anode inlet pressure, $[H_2]$ at the anode outlet, stack voltage, and current versus time respectively over a time period just before and then after the voltage reversal event. At time~12:50 in FIG. 3, the oscillation in anode inlet pressure is noted as being relatively large (denoted "i" in FIG. 3a). Shortly afterwards at time~12:51, the anode inlet pressure is seen to go to a minimum (denoted "ii"). The stack voltage is seen to dip substantially (denoted "iii") when the anode inlet pressure initially went low and afterwards rises by about 20 volts (denoted "iv") when the anode pressure rose again. The stack current is seen to increase (denoted "v"). And the $[H_2]$ at the anode outlet is seen to drop substantially at this time too (denoted "vi"). These observations signal the onset of a fuel starvation condition. From individual cell voltage monitoring (not shown in FIG. 3), it was found that several individual cells went into voltage reversal at this time too (dropping to voltages circa −1.2 V).

Following these events, the stack voltage is seen to oscillate (denoted "vii") in step with the oscillations in the anode inlet pressure (denoted "viii"). At time~13:00 in FIG. 3, the anode inlet pressure was increased (denoted "ix") and this resulted in an observable increase in $[H_2]$ at the anode outlet (denoted "x"). (The stack current is also seen to increase (denoted "xi"). However, by now it is too late to help prevent severe damage. From individual cell voltage monitoring, it was noted that some individual cells went into deeper reversal (below −2 V) and the current through the stack increased yet again.

It is evident from the details presented in FIGS. 3a to 3d that the voltage reversal situation and the severe consequences associated with it could have been prevented by taking appropriate remedial action in response to the noticeable voltage change at time~12:50.

Figure 4:
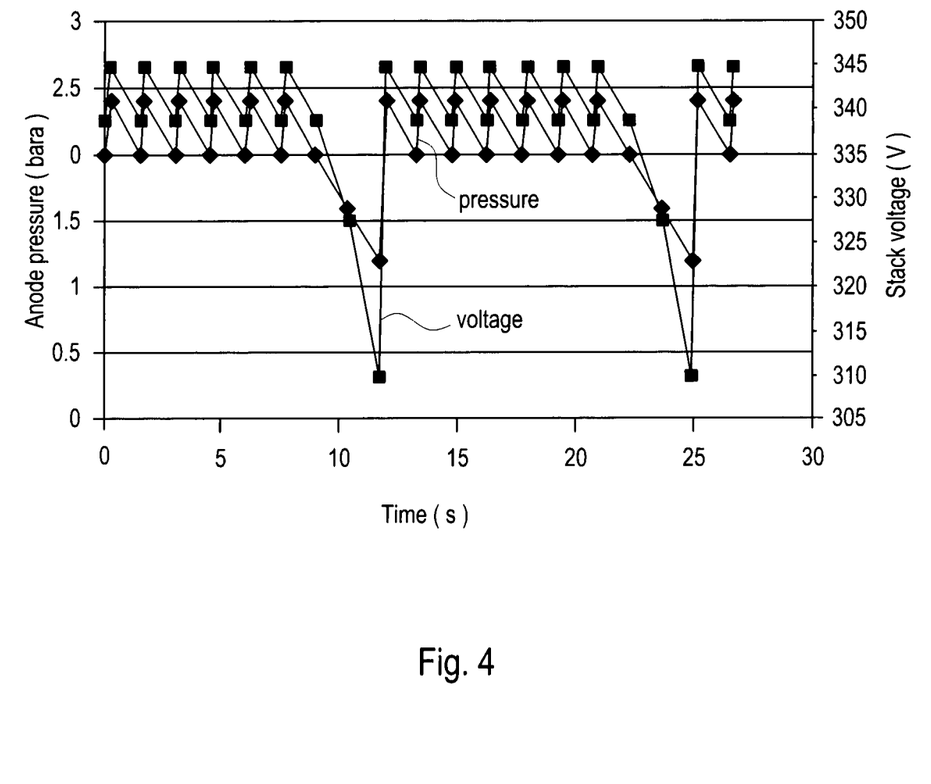

FIG. 4 illustrates an option for increasing the sensitivity of the inventive method by periodically reducing the fuel pressure at the anode inlet. In FIG. 4, the anode inlet pressure and stack voltage versus time of a theoretically similar fuel cell stack are illustrated. Over most of the plot, the anode fuel pressure is assumed to oscillate in the usual manner with the stack voltage oscillating in step accordingly. Periodically though, the anode fuel pressure is considered to be reduced by about a factor of 3 greater than usual. However, the stack voltage is expected to drop by a factor much greater than 3 at these times. As is evident then from FIG. 4, the amplitude of oscillation in the electrical output (i.e. stack voltage) should increase with the periodic reduction in anode inlet pressure. This procedure would also be expected to help with water management in the fuel cells because the jet pump gives higher changes in anode inlet pressure at lower absolute anode inlet pressures and the change lasts for longer.

All of the above U.S. patents, U.S. patent applications, foreign patents, foreign patent applications and non-patent publications referred to in this specification, are incorporated herein by reference in their entirety.

While particular elements, embodiments and applications of the present invention have been shown and described, it will be understood, of course, that the invention is not limited thereto since modifications may be made by those skilled in the art without departing from the spirit and scope of the present disclosure, particularly in light of the foregoing teachings. Such modifications are to be considered within the purview and scope of the claims appended hereto.

What is claimed is:

1. A method for use in an operating fuel cell system, the fuel cell system including a solid polymer electrolyte fuel cell, an oxidant supply subsystem, and a fuel supply subsystem, the fuel supply subsystem having a fuel supply, and a regulating apparatus for regulating a pressure of fuel supplied to an anode inlet of the solid polymer electrolyte fuel cell wherein the fuel supply is connected to an inlet of the regulating apparatus and the anode inlet of the solid polymer electrolyte fuel cell is connected to an outlet of the regulating apparatus, and wherein an outlet pressure from the outlet of the regulating apparatus oscillates when the fuel cell system is operating, and the fuel cell system further including an electrical output monitor for monitoring an electrical output of the solid polymer electrolyte fuel cell, the method comprising:

monitoring the electrical output of the solid polymer electrolyte fuel cell while the fuel cell system is operating;

determining an amplitude of oscillation in the electrical output of the solid polymer electrolyte fuel cell resulting from an oscillation in the outlet pressure;

determining a fuel starvation condition when the determined amplitude of oscillation in the electrical output exceeds a predetermined amount; and in response to determining the fuel starvation condition, taking a remedial action to lessen the fuel starvation condition.

2. The method of claim 1 wherein the fuel supply subsystem comprises a fuel recirculation line connecting an anode outlet of the solid polymer electrolyte fuel cell to the anode inlet of the solid polymer electrolyte fuel cell, and the regulating apparatus comprises a jet pump comprising a high pressure nozzle inlet, a low pressure inlet, and an outlet, wherein the fuel supply is connected to the high pressure nozzle inlet and the fuel recirculation line is connected in series to the low pressure inlet and the outlet of the jet pump.

3. The method of claim 1 wherein the fuel supply subsystem comprises a fuel recirculation line connecting an anode outlet of the solid polymer electrolyte fuel cell to the anode inlet of the solid polymer electrolyte fuel cell, and the regulating apparatus comprises a hydrogen recycle blower.

4. The method of claim 1 wherein the regulating apparatus comprises an on-off valve.

5. The method of claim 1 wherein the outlet pressure oscillates with a period of less than five seconds.

6. The method of claim 1 wherein the electrical output monitor is a voltage output monitor or a current output monitor.

7. The method of claim 6 wherein the electrical output is voltage or current.

8. The method of claim 1 wherein operating the fuel cell system comprises a normal periodic purging step comprising:

purging a normal amount of purge gas from an anode outlet of the solid polymer electrolyte fuel cell, and the remedial action comprises purging a greater than the normal amount of purge gas from the anode outlet of the solid polymer electrolyte fuel cell if the determined amplitude of oscillation in the electrical output exceeds the predetermined amount.

9. The method of claim 1 wherein the remedial action is selected from the group consisting of operating the regulating apparatus such that the outlet pressure from the outlet of the regulating apparatus is at greater pressure, reducing a current drawn from the solid polymer electrolyte fuel cell, delaying an increase in the current drawn from the solid polymer electrolyte fuel cell, reducing a coolant inlet temperature, and increasing a relative humidity of an oxidant supplied to a cathode of the solid polymer electrolyte fuel cell.

10. The method of claim 1 comprising periodically reducing the pressure of fuel supplied to the anode inlet of the solid polymer electrolyte fuel cell, to increase the amplitude of oscillation in the electrical output of the solid polymer electrolyte fuel cell.

11. The method of claim 1 wherein the fuel cell system is an automotive fuel cell system.

\* \* \* \* \*

UNITED STATES PATENT AND TRADEMARK OFFICE
CERTIFICATE OF CORRECTION

| | | |
|---|---|---|
| PATENT NO. | : 11,411,235 B2 | |
| APPLICATION NO. | : 16/480630 | |
| DATED | : August 9, 2022 | |
| INVENTOR(S) | : Richard Fellows | |

It is certified that error appears in the above-identified patent and that said Letters Patent is hereby corrected as shown below:

On the Title Page

Under Related U.S. Application Data, Item (60) should read "Provisional application No. 62/460,764, filed on Feb. 18, 2017."

Signed and Sealed this
First Day of November, 2022

Katherine Kelly Vidal
*Director of the United States Patent and Trademark Office*